United States Patent
Fields et al.

(10) Patent No.: US 6,308,210 B1
(45) Date of Patent: Oct. 23, 2001

(54) METHOD AND APPARATUS FOR TRAFFIC CONTROL AND BALANCING FOR AN INTERNET SITE

(75) Inventors: Duane Kimbell Fields, Austin; Thomas Preston Gregg, Round Rock; Sebastian Hassinger, Blanco; William Walter Hurley, II, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,132

(22) Filed: Dec. 10, 1998

(51) Int. Cl.$^7$ ........................................ G06F 11/30
(52) U.S. Cl. ............................. 709/224; 709/105
(58) Field of Search ...................... 709/105, 224, 709/217

(56) References Cited

U.S. PATENT DOCUMENTS

| 6,006,262 | * 12/1999 | Thomason et al. ................ 709/224 |
| 6,131,110 | * 10/2000 | Bates et al. ........................ 709/203 |

* cited by examiner

*Primary Examiner*—Kenneth R. Coulter
(74) *Attorney, Agent, or Firm*—Jeffrey S. LaBaw; Duke W. Yee; Michael R. Nichols

(57) ABSTRACT

The invention is used to balance and control traffic within a single internet site or between multiple sites. A static or dynamic analysis of site usage is performed. When an under-visited portion of a site is identified, then a link or message is created on a more-visited portion of the web-site to motivate the user visiting the site to explore the under-visited portion. The portion can be a specific page of the web site, or an entire section.

17 Claims, 4 Drawing Sheets

METHOD AND APPARATUS FOR TRAFFIC CONTROL AND BALANCING FOR AN INTERNET SITE

BACKGROUND OF THE INVENTION

1. Technical Field

The present invention relates to both a method and an apparatus for balancing the traffic at a multi-page web site on the Internet. Specifically, the system analyzes the number of "hits" for each page of the site and can automatically nest links on more visited pages to entice the user to less visited pages.

2. Description of Related Art

The Internet, also referred to as an "internetwork", in communications is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the web". Other Internet resources exist for transferring information, such as File Transfer Protocol (FTP) and Gopher, but have not achieved the popularity of the web. In the web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other web resources identified by a Uniform Resource Locator (URL). A URL is a special syntax identifier defining a communications path to specific information. Each logical block of information accessible to a client, called a "page" or a "web page", is identified by a URL. The URL provides a universal, consistent method for finding and accessing this information by the web "browser". A browser is a program capable of submitting a request for information identified by a URL at the client machine. Retrieval of information on the web is generally accomplished with an HTML-compatible browser.

When a user desires to retrieve a page, a request is submitted to a server connected to a client computer at which the user is located and may be handled by a series of servers to effect retrieval of the requested information. The information is provided to the client formatted according to HTML. Typically, personal computers (PCs) along with work stations are typically used to access the Internet.

Web sites include a home page that can provide an introduction to the web site and its contents. The web site can include many pages, a portion of which are accessible from the home page. The home page can contain links to other pages within the web site as well as links to other web sites. A single company may have multiple web sites or a single web site with multiple pages. The pages are generally grouped into directories. For example, the home page for a large corporation may have a link to pages containing product information, corporate information, job listings within the corporation, as so forth. If the product listing link is selected, then a the next web page displayed might show a directory of product families. For example, an electronics manufacturer might have a product page that gives links to additional pages on facsimile machines, with another link to pages for the company's copier machines, or digital cameras. When the facsimile link is selected, a listing might appear showing the various models of facsimile machines available. Thus, a user navigates through the company's web site.

Not all pages within a web site are visited with the same frequency. Carrying on the example above, maybe the site contains a total of one hundred web pages including the home page. Perhaps, twenty of those pages are devoted to facsimile machines, with three of those devoted to high speed facsimile machines. After analysis, it might be discovered that those three pages received over sixty percent of the web site's visitations or "hits." Additionally, it might be discovered that five of the pages received no hits at all. Thus, a need exists for a method of balancing traffic within a web site. Such a method should provide an enticement or a link to motivate the user to visit the less popular pages.

SUMMARY OF THE INVENTION

The present invention controls the flow of traffic within a web site or even between multiple web sites. The system is implemented in software on a networked computer. The software program can have several attributes. It can statically respond to an initial analysis of web site traffic. Alternatively, it can dynamically track web site traffic and respond to these periodically or constantly updated traffic statistics. When a reduced number of hits is recognized for a page on a web site, then this software invention can create an additional link on either the home page or other popular page within the same site. Alternatively, the present invention might create an enticing message on a popular page that would motivate the user to visit the under-visited page. For example, if web site analysis showed that many users visited pages regarding high speed fax machines, a message or link might be nested on those pages suggesting a visit to pages with information on high speed network printers that can also scan and fax documents. The user was probably unaware of these complementary products, and thus, a new link or message would motivate the user to those pages. The creation of additional links or messages moves a page forward in the flow of the web site. In other words, as mentioned above, a user might begin his navigation with the home page, progress to the products page, select the facsimile product page and then look a specific model. If traffic for that particular model is slow, a new link could be placed on the home page or products page linking the user to that specific model's page. Thus, the user does not have to "dig as deep" into the web site before finding the specific model's page.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
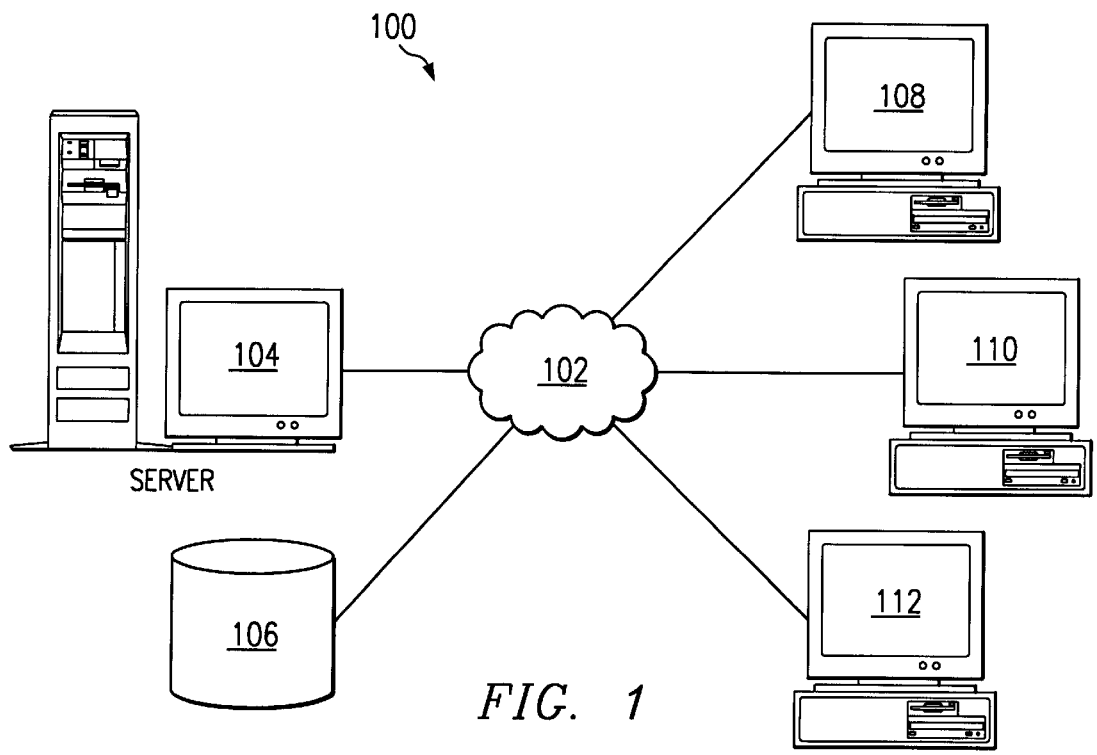
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers of network computers. For purposes of this application, a network computer is any computer, coupled to a network, which receives a program or other application from another computer coupled to the network. In the depicted example, server 104 provides data, such as boot files, operating system images, and applications to NCs 108–112. NCs 108, 110, and 112 are clients to server 104. Distributed data processing system 100 may include additional servers, clients, and other devices not shown. FIG. 1 is intended as an example, and not as an architectural limitation for the processes of the present invention.

Figure 2:
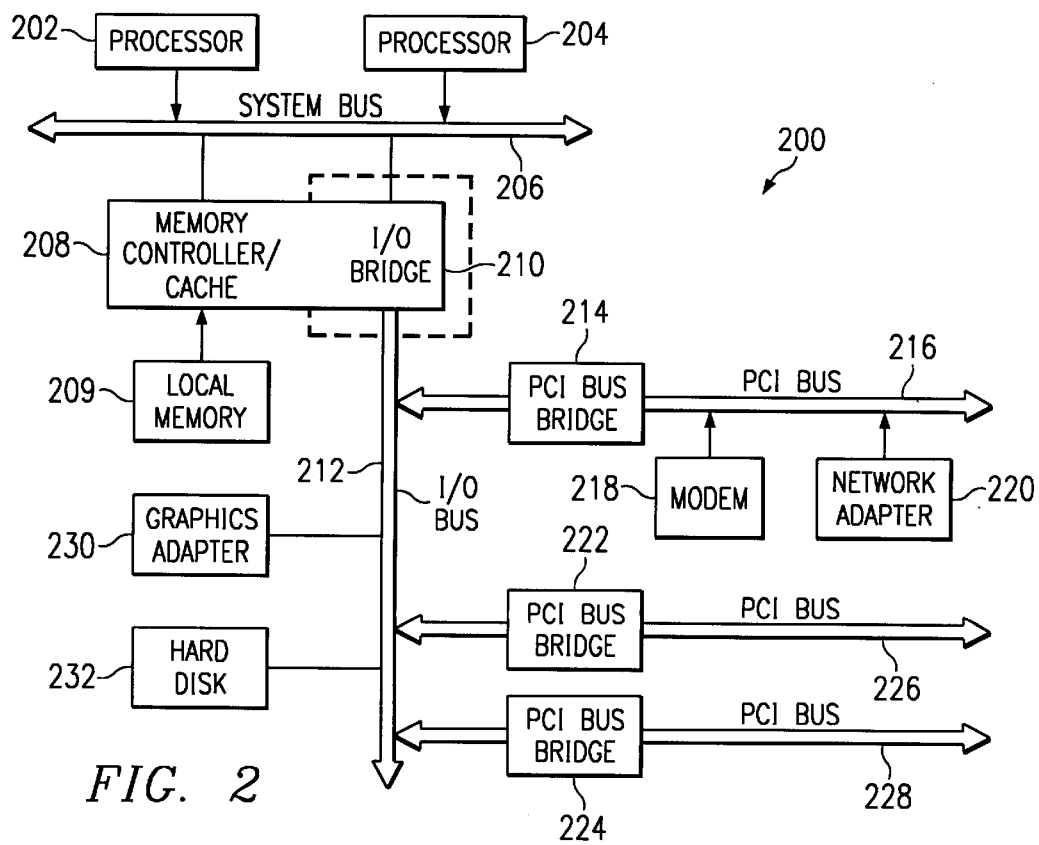
FIG. 2 is a block diagram of a data processing system that may be implemented as a server.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
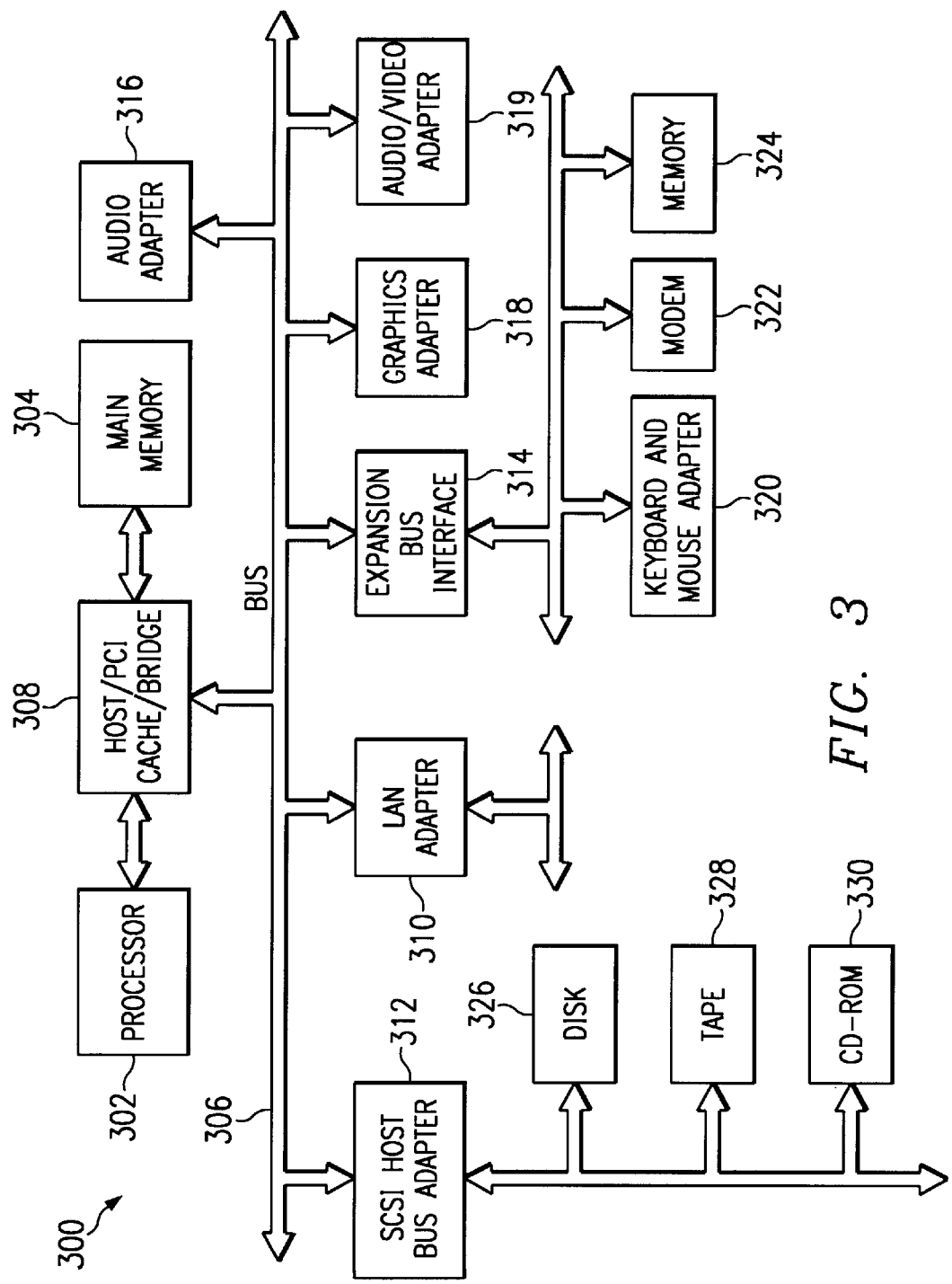
FIG. 3 is a block diagram of a data processing system in which the present invention may be implemented.

With reference now to FIG. 3, a block diagram of a data processing system 300 in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 112 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

Figure 4:
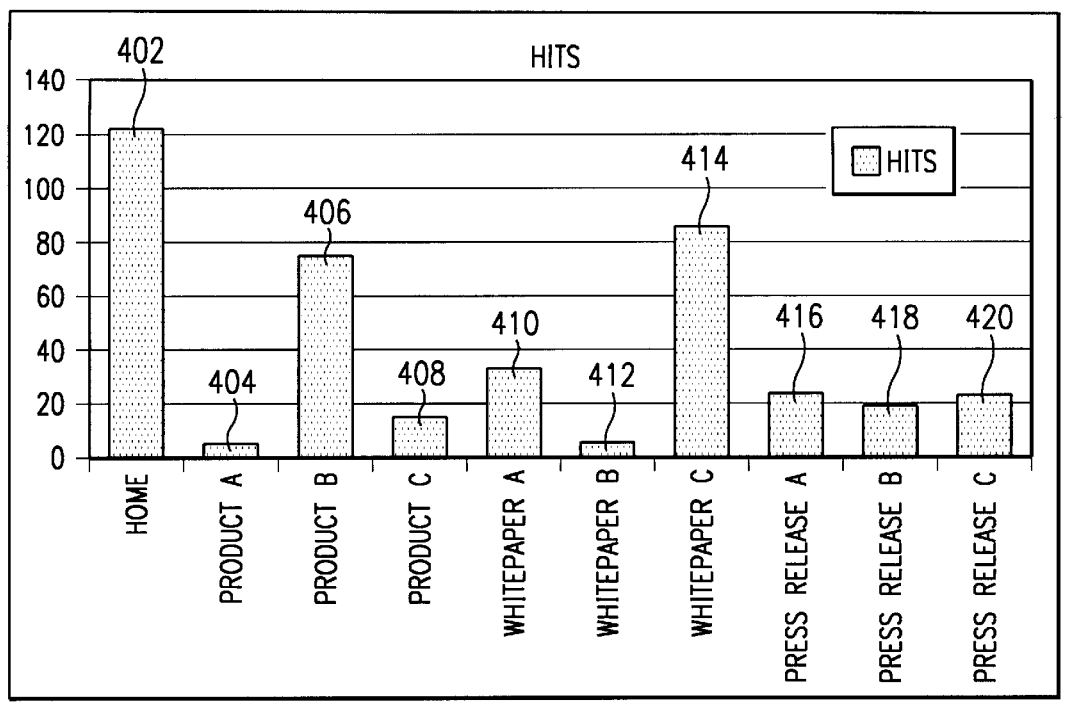
FIG. 4 is statistical representation of traffic on a typical web site.
Figure 5:
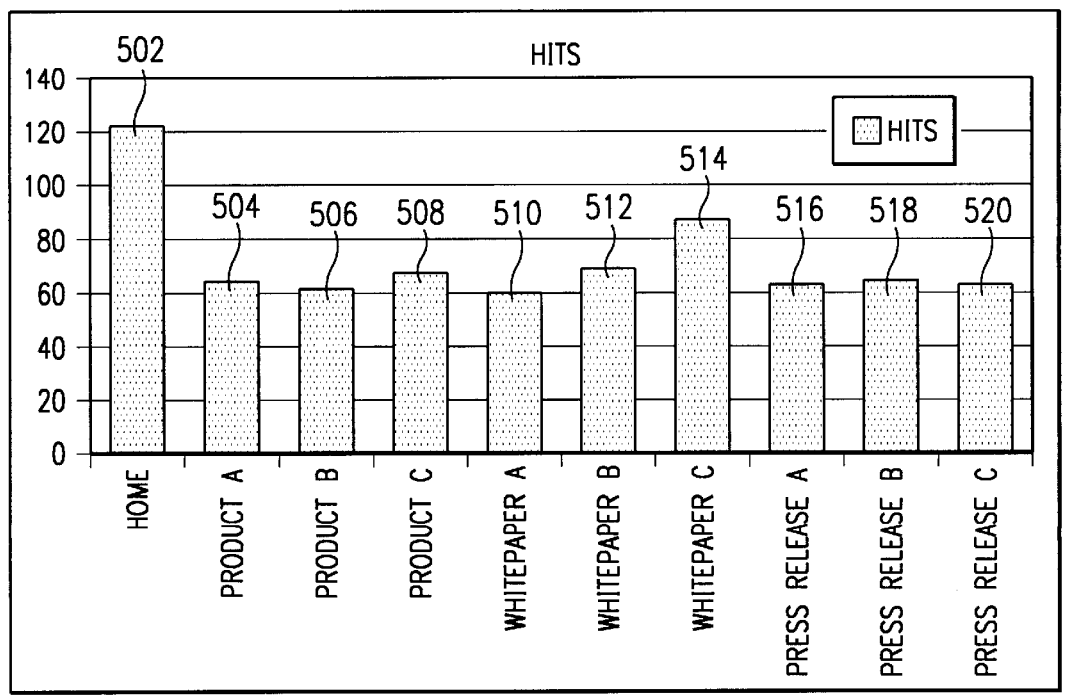
FIG. 5 is a statistical representation of traffic on a web site that has been balanced by the present invention.

FIGS. 4 and 5 provide, for illustration purposes only, a statistical review of a standard web site and a balanced web site, respectively. FIG. 4 shows the number of hits experienced per page on a typical ten page web site. For example, the home page 402 experienced over 120 hits over a predetermined amount of time. This should be expected because most users explore a web site starting with the home page. Likewise, both Product B 406 and Whitepaper C 414 had a substantial number of hits, each logging almost eighty hits for the same time period. Again, a hit is defined as a visit to a particular web page. The analysis performed could set additional requirements before logging a hit. For example, a user might have to stay on a page for more than ten seconds before a hit is logged. The analysis of FIG. 4 also shows that the Product A 404, Product C 408, and Whitepaper B 412 had poor visitation, each logging fewer than twenty hits. Finally, the three press releases 416, 418, and 420 each had low visitation with approximately twenty hits each.

When the present invention is implemented, the visitation between the sites is dramatically leveled. This usage-leveling is achieved by the automatic placement of links between the most visited pages, making access to the less visited pages simpler and thus more enticing to a user. For this example, an additional link might be located on the home page 502 encouraging the visitor to explore the Press Releases 516, 518, and 520. Such a prominent display should entice more users to visit those pages. Likewise, a link on Product B page 506 could encourage a visitor to read more about that product in a particular press release. In similar fashion, Whitepaper C 514 could be nested with links to Product pages 504 and 508. While, the discussion has focused on usage-leveling within a web site, the usage-leveling could be spread across many web sites. For example, if a company has several sites, one each for its divisions, it might choose to entice a visitor to one site to also explore another of its sites.

Figure 6:
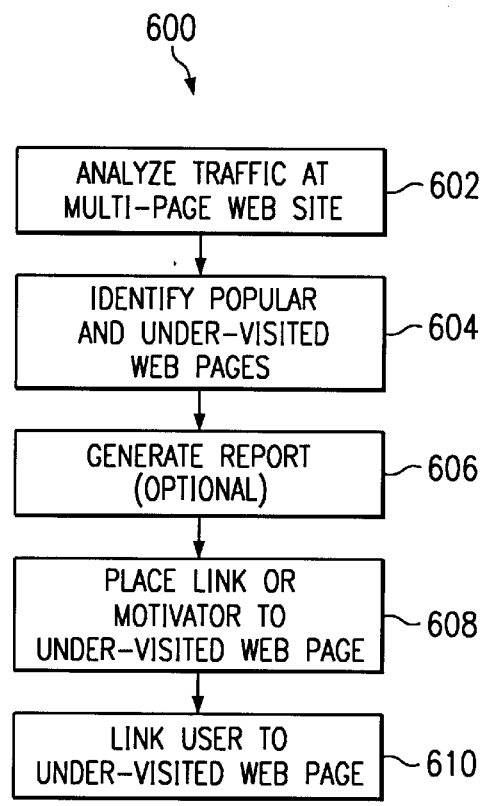
FIG. 6 is a flow chart of the methodology employed by the present invention.

The general method of the invention is described by the flowchart 600 of FIG. 6. An initial analysis is performed on the usage pattern within the site (step 602). A site analysis for usage-leveling can be applied on a one-time basis before links are automatically nested through out the site. Alternatively, the analysis could be performed on a regular basis with links established and deleted as determined by the most current analysis. Once the analysis is performed, the popular and the under-visited pages within the site are identified (step 604). An optional report can be generated for the administrator or other user of the system (step 606). Once the popular web pages or sites are identified, those pages can be provided with links to less-visited sites (step 608). Alternatively, or in addition to the additional links, a motivating advertisement for the other page might be placed on the popular page or site. If the link is chosen, then the visitor will be provided with the content of the linked page (step 610). One method of leveling might involve placing a prompt for the least popular page on the most popular page. The next to least popular page could have a link placed on the next to most popular page. Alternatively, an averaging technique could be applied. Using the example started in FIGS. 4 and 5, the three press release pages averaged about twenty hits each. Links to those pages could be established with a page having, for example, eighty hits. The particular popular page could be selected to produce an acceptable average of total hits to total pages. In this example, the four pages would have a pre-balanced average of average of one hundred and forty hits, or thirty-five hits per page. Likewise, three pages of ten hits each could be linked to a popular page having one hundred and twenty hits to produce an average of four pages with one hundred and fifty hits, or about thirty-eight hits per page on average. Of course, many different algorithms could be applied to determine the location of the links used to level usage throughout the web site or between multiple sites. Indeed, even the location and prominence of the link could be adjusted to improve the effectiveness of the present invention. Further, while the primary purpose of this invention is the leveling of usage, it could also be effectively used to drive users into certain pages. In other words, other pages could be automatically nested with links to that page, with the goal of driving its visitation higher.

Figure 7:
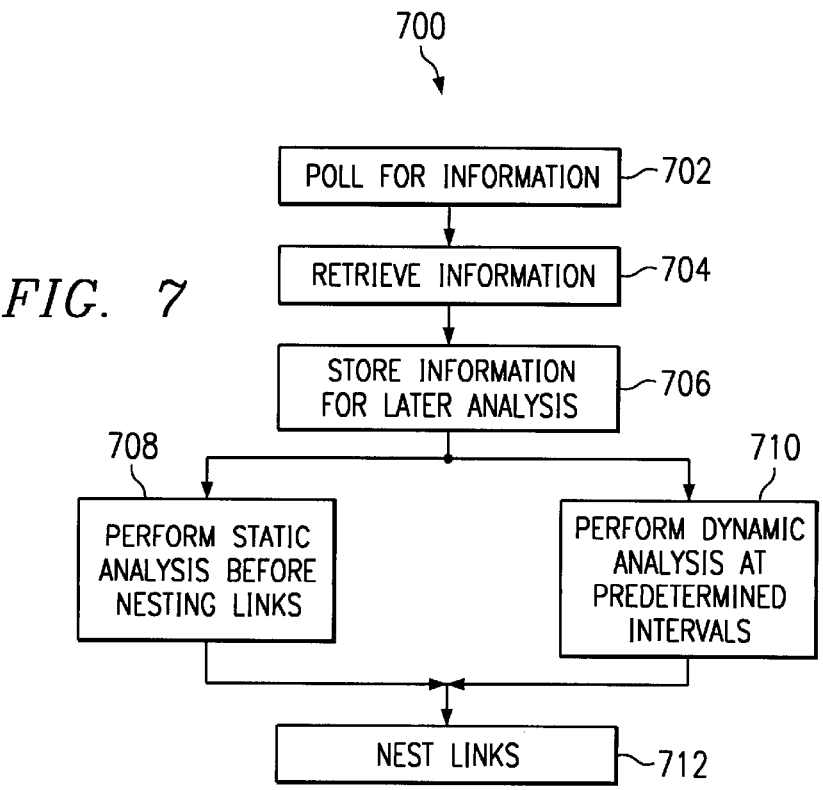
FIG. 7 is a flow chart outlining the general method of performing the analysis of web site usage.

The method 700 of analyzing the traffic at a multi-page web site is illustrated in FIG. 7. This method generally corresponds with step 602 shown in FIG. 6. First, the site must be polled for information (step 702). Once polled, the information is retrieved (step 704). The information retrieved can then be stored for later analysis (step 706). Next, an analysis, such as one described above, is performed on either a static basis (step 708) or a dynamic basis (step 710). Based on the results of such an analysis, links are nested (step 712) on the under-visited pages within the site.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for leveling the traffic within a web site having a plurality of web pages, said method comprising the steps of:
   (a) analyzing a usage level for at least a set of said plurality of web pages;
   (b) identifying a first web page with a higher usage level
   (c) responsive to identifying the first web page with a higher usage level, inserting at least one prompt in said higher usage level page for a lower usage level page.

2. The method of claim 1 wherein step (a) further comprises performing a static analysis.

3. The method of claim 1 further comprises reanalyzing usage level after the step of inserting at least one prompt.

4. The method of claim 1 further comprises identifying a plurality of higher usage level pages within a web site.

5. The method of claim 1 wherein step (c) further comprises inserting a link between the higher usage level page and the lower usage level page.

6. The method of claim 5 wherein said link is inserted in a plurality of higher usage level pages.

7. The method of claim 5 wherein said links are inserted in a plurality of higher usage level page based on an averaging of usage between the higher usage level pages and lower usage level pages.

8. The method of claim 1 wherein said prompt is a message inviting a user to visit the lower usage level page.

9. The method of claim 1 wherein said prompt is located prominently on said higher usage level page.

10. The method of claim 1, further comprising displaying the higher usage level page with the at least one prompt to a user who has not previously viewed the higher usage level page.

11. A computer program product in a computer readable medium for controlling the traffic between a plurality of pages on a website, the product comprising:
- (a) means for analyzing a usage level for at least a set of said plurality of web pages;
- (b) means for identifying a first web page with a higher usage level
- (c) means responsive to identifying the first web page with a higher usage levels for inserting at least one prompt in said higher usage level page for a lower usage level page.

12. The computer program product of claim 11 wherein (a) further comprises means for performing a static analysis.

13. The computer program product of claim 11 further comprises means for reanalyzing usage level after the inserting at least one prompt.

14. The computer program product of claim 11 further comprises means for identifying a plurality of higher usage level pages within a web site.

15. The computer program product of claim 11 wherein step (c) further comprises inserting a link between the higher usage level page and the lower usage level page.

16. The computer program product of claim 11, further comprising means for displaying the higher usage level page with the at least one prompt to a user who has not previously viewed the higher usage level page.

17. A data processing system for controlling the traffic on a web site having a plurality of web pages in the data processing system, the data processing system comprising:
- (a) recording means for analyzing a usage level for at least a set of said plurality of web pages;
- (b) first processing means for identifying a first web page with a higher usage level; and
- (c) second processing means responsive to identifying the first web page with a higher usage level for inserting at least one prompt in said higher usage level page for a lower usage level page.

* * * * *